United States Patent

Klopp

[15] 3,642,250
[45] Feb. 15, 1972

[54] BOMBLIFT TRAILER LIFTING MECHANISM

[72] Inventor: John H. Klopp, Baltimore County, Md.

[73] Assignee: The United States of America as represented by the Secretary of the Air Force

[22] Filed: Dec. 16, 1969

[21] Appl. No.: 885,574

[52] U.S. Cl. ............................................................254/124
[51] Int. Cl. .................................................................B66f 3/00
[58] Field of Search...................254/122, 124, 2 R, 2 B, 2 C, 254/8 R, 8 B, 8 C, 9 R, 9 B, 9 C, 10 R, 10 B, 10 C; 214/1 D, 512

[56] References Cited

UNITED STATES PATENTS

| | | | |
|---|---|---|---|
| 2,466,155 | 4/1949 | Conrad | 254/9 C X |
| 2,449,863 | 9/1948 | Ross | 254/2 C |
| 2,471,901 | 5/1949 | Ross | 254/9 C |
| 3,214,136 | 10/1965 | Marks | 254/10 C |

FOREIGN PATENTS OR APPLICATIONS 490,681    2/1954    Italy.........................................254/9 B Primary Examiner—Othell M. Simpson
Attorney—Harry A. Herbert, Jr. and Arsen Tashjian

[57] ABSTRACT

A four-wheel bomblift trailer chassis having a platform which is elevated by a scissors-type toggle linkage actuated by hydraulic piston-cylinder couples pivotally mounted on the linkage. Gear sectors and parallel tie rods are provided to constrain the toggles and stabilize the load platform to prevent lateral tilting as it is raised and lowered.

1 Claims, 1 Drawing Figure

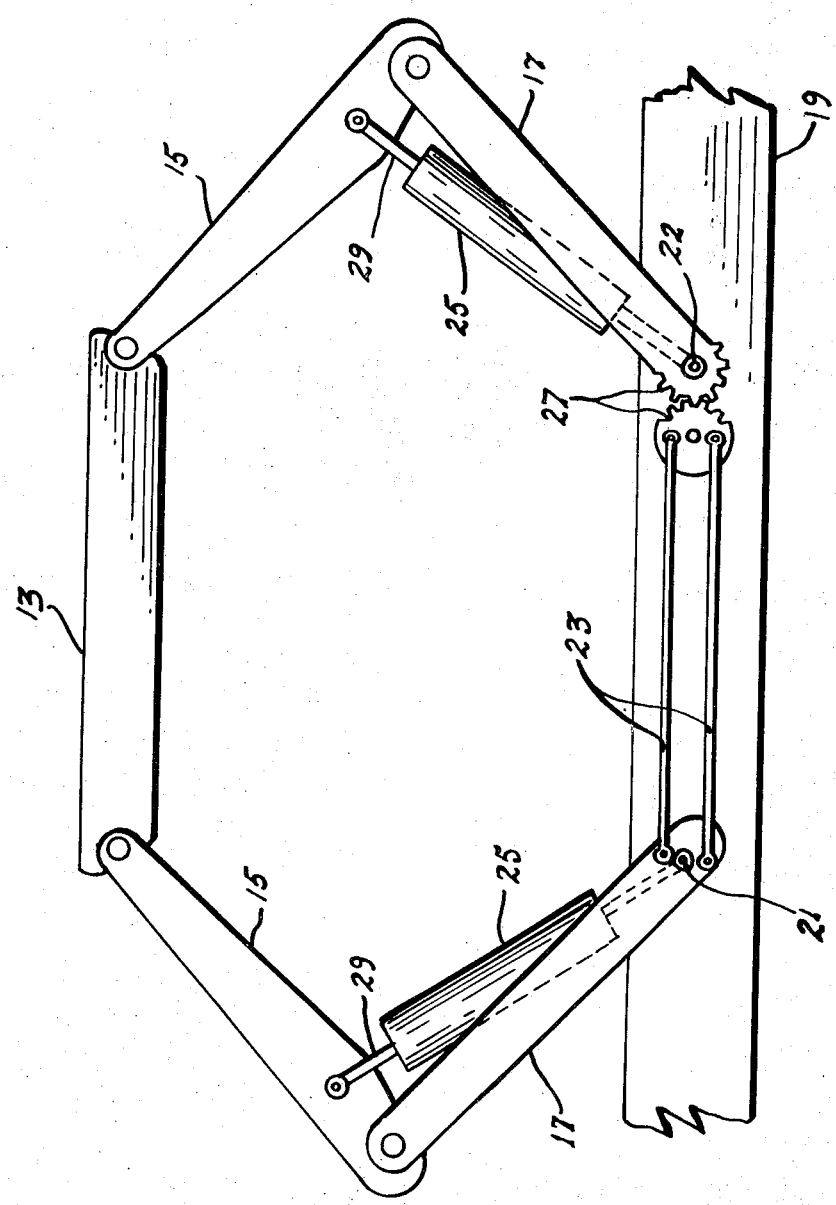

BOMBLIFT TRAILER LIFTING MECHANISM

BACKGROUND OF THE INVENTION

This invention relates to a hydraulically operated cradle lifting system and, more particularly, the invention is concerned with providing a trailer-mounted platform on which a bomb can be lifted up to and onto a bomb rack by means of a toggle arrangement with stabilizing means associated therewith.

Strict limitations are placed on weapons-handling trailer design because of the unique features of various military aircraft with which the trailer must be compatible. Many potential problem areas necessitate a thorough investigation into the various requirements for providing the ideal weapons trailer.

Some of these design problems are concerned with loading onto a particular aircraft, conventional and nuclear weapons from 10 inches to 30 inches in diameter. Other requirements for the trailer call for an operating lift capacity of up to 7,000 pounds and a lift stroke of 5 inches to 56 inches from the ground. The trailer should also provide for a cradle having store attitude adjustments of 20° in roll, 10° in pitch and yaw, and 3 inches in lateral and longitudinal translation. This latter feature requires the use of a mounting cradle having minimum widths to provide for maximum clearance for such projections as missile fins and other appendages. The store should be rigidly locked in position during transport.

In order to provide maximum clearance under the bomb for the cradle mechanism, it is necessary that the lifting mechanism not be under the cradle when in the down position. The entire height between the bomb and the ground (approximately 5 inches) must be occupied by the cradle. In a scissors-type lifting system, the mechanism should be folded forward and aft of the cradle and the legs beside the cradle. These features are necessary requirements to provide a trailer capable of lifting a store up to and onto the bomb rack of the many and varied military aircraft presently in operational use.

SUMMARY OF THE INVENTION

The present invention provides a bomblift trailer lifting mechanism wherein a hydraulically actuated cradle lifting system operates a scissors-type toggle linkage of upper and lower arm assemblies. Four hydraulic cylinders (two at each end of the trailer) supply the motive force to lift the cradle while two stabilizing assemblies, one each connecting the lower ends of the lower arm assemblies, serve to stabilize the cradle by controlling the toggle linkage. Forward and aft shaft assemblies are located at the front and rear ends of the trailer and are supported by bearings pressed in the longitudinal frame beams of the trailer.

Stabilization in any vertical position is furnished by two stabilizing assemblies, and the triangle formed by the hydraulic cylinder, the lower arm assembly, and a portion of the upper arm assembly. The stabilizing assembly provides a rigid link between the two lower arm assemblies at their points of pivot about the forward and aft shafts. It is essentially a four-bar linkage system consisting of two horizontal bars pinned to the lower arm at the forward shaft and spur geared to the lower arm at the aft shaft. The function of the gears is to insure that the lower arms rotate in opposite directions and through equal angles during the lift cycle.

In the normal down position, the linkage system is fully retracted and the cradle rests directly on the two shaft assemblies. When the hydraulic cylinders are activated the piston rods extend, forcing the upper arm assemblies upward, lifting the cradle. This causes the lower arm assemblies to follow the upper arms, rotating about their respective shafts until the cylinders are fully extended and the lift system is in the up position. During lift, the forward cylinders supply fluid to the aft cylinders through an independent, closed hydraulic system, thus ensuring identical lift rates between the forward and aft arm assemblies.

Accordingly, it is an object of the invention to provide a bomblift trailer lifting system capable of quickly and easily lifting a bomb up to and onto a bomb rack on military aircraft of various design and dimensions.

Another object of the invention is to provide a trailer lifting system which is compatible with conventional and nuclear weapons of various diameters up to and including one 30 inches in diameter.

Still another object of the invention is to provide a lifting system for a bomblift trailer having an operating lift capacity of up to 7,000 pounds.

A further object of the invention is to provide a bomblift trailer lifting system which can be lowered to within 5 inches of the ground and raised to a height of 56 inches off the ground.

A still further object of the invention is to provide a lifting system which is completely stable in any vertical position while at the same time allowing roll, pitch and yaw adjustments to accommodate various requirements of military aircraft.

Another still further object of the invention is to provide a scissors-type toggle linkage for use on a lifting system wherein extension of the piston rods of the hydraulic cylinders serve to raise and lower a cradle held on the toggle linkage and to position the store so that it can be attached to the aircraft.

These and other objects, features and advantages will become more apparent after considering the description that follows taken in conjunction with the attached drawings wherein like numbers are used throughout to identify like elements.

DESCRIPTION OF THE DRAWING

The drawing is a view of the bomblift trailer lifting system according to the invention showing the scissors-type toggle linkage and hydraulic cylinders in an upwardly extended position.

DESCRIPTION OF A PREFERRED EMBODIMENT

Referring now to the drawing, there is shown a cradle lifting system and stabilizing system according to the invention. The cradle lifting system is a hydraulically actuated stable linkage system which includes a cradle 13, upper arm assemblies 15 and lower arm assemblies 17. Although only one system is shown, in a preferred embodiment of the invention, there are two identical linkage systems in spaced side-by-side relationship with the cradle 13 operatively positioned between the upper ends of upper arm assemblies 15. All joints which connect the various elements are pivotal in nature to allow rotational movement.

The lower ends of the lower arm assemblies 17 are pivotally attached to the longitudinal frame member 19 and include the forward bearing points 21 and the aft bearing points 22 at the points of attachment. The longitudinal frame member 19 is preferably fabricated of high-strength, heat-treated aluminum in hollow box-beam construction and includes bosses (not shown) that provide structural hard-points, such as at the bearings 21 and 22, for the attachment of the lower arm assemblies 17. In the normal trail position, the stores cradle 13 rests on two transverse steel shafts (not shown) having terminal ends at points 21 and 22 for distributing the load directly into the frame.

Stabilization in any vertical position is furnished by two stabilizing assemblies 23 and triangles formed by the hydraulic cylinders 25, the lower arm assemblies 17, and a portion of the upper arm assemblies 15. The stabilizing assemblies 23 provide a rigid link between the two lower arm assemblies 17 at their points of pivot 21 and 22 about the forward and aft shafts, respectively. It is essentially a four-bar linkage system consisting of two horizontal bars 23 pinned to one lower arm 17 at the forward shaft and bearing point 21 and operatively connected by spur gears 27 to the other lower arm 17 at the aft shaft and bearing point 22. The function of the gears 27 is to insure that the lower arms 17 rotate in opposite directions and through equal angles during the lift cycle.

In the normal down position, the linkage system is fully retracted and the cradle 13 rests directly on the two shaft assemblies, the end points of which are shown at 21 and 22. When the hydraulic cylinders 25 are activated the piston rods 29 extend, forcing the upper arm assemblies to follow the upper arms 15 rotating about their respective pivot points until the cylinders are fully extended and the lift system is in the up position. During lift, the forward cylinders supply fluid to the aft cylinders through an independent, closed hydraulic system, thus ensuring identical lift rates between the forward and aft arm assemblies.

The lift arm cylinders 25 convert hydraulic energy into linear motion required to raise the cradle 13 and lift-arm assembly. In practice, four cylinders 25 are used, two mounted on each shaft assembly 21 and 22. Small holes (not shown) are provided in both shaft assemblies for passage of hydraulic fluid which simplifies the routing of fluid to the cylinders. Also, the fluid from the forward cylinders is forced into the aft cylinders to ensure identical stroke rates for all cylinders and to stabilize the lift-arm assemblies.

Although the invention has been illustrated in the accompanying drawing and described in the foregoing specification in terms of a preferred embodiment thereof, the invention is not limited to this embodiment or to the particular configuration mentioned. It will be apparent to those skilled in the art that my invention could have extensive use in other transfer and loading operations where mobility and versatility are primary requirements. Also, it should be understood that various changes, alterations, modifications and substitutions, particularly with respect to the construction details, can be made in the arrangement of the several elements without departing from the true spirit and scope of the appended claims.

Having thus described my invention, what I claim as new and desire to secure by Letters Patent of the United States is:

1. In a bomblift trailer lifting mechanism, the improvement comprising a cradle for holding a store, an upper arm assembly pivotally attached to each end of said cradle, a lower arm assembly having one end pivotally attached to said upper arm assembly, the other end of said lower arm assembly being pivotally attached to one longitudinal frame member of the bomblift trailer, a hydraulic cylinder positioned between the lower end of said lower arm assembly and said upper arm assembly for raising and lowering said cradle by causing said upper and lower arm assemblies to rotate about their respective pivotal connections, the extension of the piston rod from said hydraulic cylinder causing said cradle to lift upward, and stabilizing means for maintaining said cradle in substantially horizontal position during the raising and lowering operation, said stabilizing means including a pair of tie rods positioned between the lower ends of said lower arm assembly and spur gear means operatively positioned at the lower end of one of said lower arm assemblies, thereby causing the lower arm assemblies to rotate in opposite directions and through equal angles during the lift cycle.

* * * * *